United States Patent Office 3,755,588
Patented Aug. 28, 1973

3,755,588
PENICILLANIC ACID IN DOSAGE-UNIT FORM
Frantz Johannes Lund, Lyngby, Denmark, assignor to Lovenskemiske Fabrik Produktionsaktieselskab, Ballerup, Denmark
No Drawing. Filed Nov. 4, 1970, Ser. No. 86,977
Int. Cl. A61k 21/00
U.S. Cl. 424—271    3 Claims

ABSTRACT OF THE DISCLOSURE

The invention relates to a pharmaceutical composition in dosage-unit form for use in the treatment of infectious diseases and comprising, as an active ingredient, the hitherto unknown 6-[(hexahydro-1H-azepin-1-yl)-methyleneamino]-penicillanic acid or a derivative thereof of the formula:

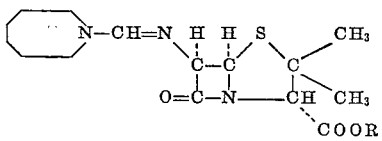

wherein R is hydrogen or a —CH$_2$OCO—A group, wherein A is aliphatic group of from 1 to 6 carbon atoms, or a pharmaceutically acceptable salt of such acid or ester, the quantity of the active ingredient in a dose being from 25 to 1000 mg. calculated as the free acid.

---

This invention relates to a pharmaceutical composition having antibacterial activity, especially on gram-negative bacilli, and particularly to the composition in dosage-unit form containing, as an active ingredient, at least one member of the group consisting of new 6-amino-penicillanic acid derivatives of the following formula

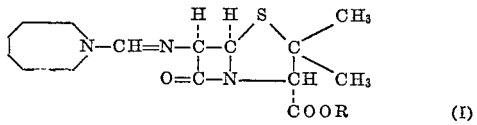

in which R is hydrogen or a —CH$_2$OCO—A radical, and A is an aliphatic radical having from 1 to 6 carbon atoms, and pharmaceutically acceptable salts thereof.

More particularly, A may represent an aliphatic hydrocarbon radical, in which the carbon chain can be straight or branched, saturated or unsaturated with maximum 6 carbon atoms, e.g. methyl, ethyl, propyl, isopropyl, butyl, sec. or tert. butyl, pentyl, hexyl, cyclopentyl, cyclohexyl, cyclopentenyl or cyclohexenyl.

In a preferred compound of the invention, A represents a tert. butyl group.

Salts of the acids are preferably the alkali metal salts, the alkaline-earth metal salts, and salts with organic amines. Salts of the esters are preferably salts with inorganic acids, e.g. hydrochloric, hydrobromic, hydroiodic acid and sulphuric acid, and organic acids, e.g. acetic, citric, tartaric, maleic acid, and p-toluene sulfonic acid.

The said compounds and salts thereof as well as methods of preparing them have been described and claimed in concurrently filed patent application, Ser. No. 86,966, of Lund, the disclosure of which is included herein by reference to the specification of the said application.

The compounds forming the active ingredients in the pharmaceutical compositions of the invention possess strong antibacterial effect, especially on gram-negative bacteria, and the toxicity is extremely low. This effect is quite unexpected, since of the hitherto known derivatives of 6-aminopenicillanic acid only those being substituted with an acyl group at the 6-amino group have shown an antibacterial effect. The effect on penicillin-sensitive, gram-positive bacteria is less than that of benzylpenicillin and of α-aminobenzylpenicillin, whereas the effect on gram-negative bacilli, e.g. coli and salmonella species, is on a many times higher level than that of e.g. benzyl penicillin and α-aminobenzylpenicillin. Table A below shows the antibacterial spectrum of 6-[(hexahydro-1H-azepin - 1 - yl)-methyleneamino]-penicillanic acid, hydrochloride, dihydrate (in the table called FL 1060) as compared with α-aminobenzylpenicillin (ampicillin; abbr: Amp.) and benzylpenicillin (in the table called G-Pen.). IC$_{50}$ means the concentration required for 50% inhibition.

TABLE A

| | IC$_{50}$ (μg./ml.) | | |
|---|---|---|---|
| | FL 1060 | Amp. | G-Pen. |
| Gram pos. and gram neg. strains: | | | |
| Staph. aureus, penicillin sensitive | 5.0 | 0.025 | 0.016 |
| Staph. aureus, penicillinase producing | >100 | 130 | 100 |
| Diplococcus pneumoniae EA | 3.2 | 0.01 | 0.01 |
| Streptococcus pyogenes | 0.50 | 0.013 | 0.008 |
| Streptococcus faecalis E13 | >100 | 0.79 | 3.2 |
| Corynebacterium xerosis FF | 1.6 | | 0.013 |
| Listeria monocytogenes FT | 50 | 0.10 | 0.10 |
| Erysipelothrix insidiosa FU | 20 | 0.040 | 0.025 |
| Bacillus subtilis KA2 | 5.0 | 0.025 | 0.010 |
| Bacillus megatherium KD | 0.50 | | 0.016 |
| Pseudomonas aeruginosa | >100 | >100 | >100 |
| Vibrio comma | 0.40 | 0.40 | 0.79 |
| Alcaligenes faecalis | 0.63 | 0.50 | 1.6 |
| Escherichia coli, average of 36 strains | 0.089 | 2.2 | 32 |
| Escherichia coli, HA2 Leo strain | 0.016 | 2.0 | 32 |
| Klebsiella pneumoniae, average of 12 strains | 0.65 | 26 | 29 |
| Proteus, average of 8 strains | 0.23 | 1.3 | 5.4 |
| Salmonella paratyphi A | 0.13 | 0.4 | 3.2 |
| Salmonella schottmuelleri | 0.063 | 0.63 | 3.2 |
| Salmonella typhimurium | 0.063 | 0.50 | 2.5 |
| Salmonella abortivoequina | 0.040 | 0.25 | 2.5 |
| Salmonella hirschfeldii | 0.016 | 0.079 | 0.13 |
| Salmonella cholerasuis | 0.16 | 0.32 | 1.6 |
| Salmonella typhosa | 0.079 | 0.32 | 2.0 |
| Salmonella enteritidis | 0.16 | 0.40 | 2.5 |
| Shigella dysenteriae | 0.16 | 0.63 | 5.0 |
| Shigella flexneri | 0.050 | 0.79 | 10 |

These in vitro experiments indicate activities up to 2000 times the activity of benzylpenicillin and 100 times the activity of α-amino-benzylpenicillin on coli bacteria, and for salmonella bacteria the corresponding figures are 50 times and 10 times, respectively. For certain medical purposes it will be advantageous to use the free acid or a salt thereof, whereas for other purposes it will be more favourable to use an ester or a salt thereof, the esters being easily chemically or enzymatically hydrolyzed to the free acid in the organism.

For instance, in some cases the esters are absorbed more efficiently after oral administration than is the free acid. After absorption, the esters are hydrolyzed under the influence of enzymes present in the blood and tissues, resulting in liberation of the free acid. The latter will generally have a more pronounced anti-bacterial effect than that of the esters.

As stated above, the toxicity of the acid and esters is very low. For example, when 600 mg./kg. of pivaloyloxymethyl 6-[(hexahydro-1H-azepin-1-yl)-methyleneamino]-penicillanate were given orally to rats for 55 days or 200 mg./kg. of that compound was given orally to dogs for 47 days, no toxic symptoms were observed on macroscopic, biochemical or haematological examinations.

The compounds of Formula I are well tolerated compounds. The free acid is preferably used for parenteral administration in the form of an aqueous, sterile solution. In the case where esters are used, they are preferably administered orally either as such or in the form of one of their salts, and they may be mixed up with a solid carrier and/or auxiliary agents.

The favourable high blood levels obtained after oral administration of a single dose of 200 mg. of pivaloyloxymethyl 6-[(hexahydro-1H-azepin-1-yl)-methyleneamino]-penicillanate hydrochloride in 200 ml. water to 4 fasting persons appear from Table B, in which the figures show the serum concentrations in μg./ml. of the corresponding acid.

TABLE B

| Hours | μg. per ml. serum | | | | | Urinary excretion in percent of administered dose | | |
|---|---|---|---|---|---|---|---|---|
| | ¼ | ½ | 1 | 2 | 4 | 0–6 | 6–24 | 0–24 |
| Person: | | | | | | | | |
| DR | 3.2 | 6.4 | 4.2 | 1.7 | 0.34 | 43 | 6.6 | 50 |
| GK | 2.1 | 3.8 | 4.2 | 2.0 | 0.29 | 53 | 2.7 | 56 |
| BB | 2.1 | 3.8 | 3.5 | 1.6 | <0.42 | 55 | 0.81 | 56 |
| LT | 2.1 | 5.1 | 3.3 | 1.3 | 0.34 | 45 | 1.1 | 46 |

Thus, it is an object of the present invention to provide an antibacterial composition for use in the treatment of infectious diseases, which contains as an active ingredient a 6-aminopenicillanic acid derivative of the Formula I given hereinbefore, which is readily absorbed on oral or parenteral administration to give therapeutically active levels of the active compound in the organism, and being antibacterially effective, especially against gram-negative bacteria, the active ingredient being mixed up with a carrier and/or an auxiliary agent.

In such compositions, the proportion of therapeutically active material to carrier substance and auxiliary agent can vary between 1% and 95%. The compositions can either be worked up to pharmaceutical forms of presentation such as tablets, pills or dragees, or can be filled in medical containers such as capsules, or as far as mixtures are concerned filled into bottles. Pharmaceutical organic or inorganic solid or liquid carriers suitable for oral, enteral or topical administration can be used to make up the composition. Gelatine, lactose, starch, magnesium, stearate, talc, vegetable and animal fats and oils, gum, polyalkylene glycol, or other known carriers for medicaments are all suitable as carriers. Futhermoe, the compositions may contain other pharmaceutically active components which can appropriately be administered together with the compounds of the invention in the treatment of infectious diseases, such as other suitable antibiotics.

Another object of the invention resides in the selection of a dose of the compounds of the invention which can be administered so that the desired activity is achieved without simultaneous secondary effects.

The compounds are conveniently administered in dosage units containing not less substance than corresponding to from 0.025 g. to 1 g. of the free acid of Formula I ($R^3$=OH) and preferably to from 0.05 to 0.5 g. By the term "dosage unit" is meant a unitary, i.e. a single dose capable of being administered to a patient, and which may be readily handled and packed, remaining as a physically stable unit dose, comprising either the active material as such or a mixture of it with a solid pharmaceutical carrier.

In the form of a dosage unit the compound may be administered once or more times a day at appropriate intervals, always depending, however, on the condition of the patient.

Thus, a daily dose will preferably amount to from 0.2 to 5.0 g. of the compound of the invention calculated as free acid.

The following non-limiting examples describes the preparation of a dosage unit in tablet form, and of a composition for injection purposes.

EXAMPLE 1

Preparation of tablets containing pivaloyloxymethyl 6-[hexahydro - 1H-azepin-1-yl)-methyleneamino]-penicillanate, hydrochloride Ingredients: G.
Pivaloyloxymethyl 6[(hexahydro-1H-azepin-1-yl)-methyleneamino]-penicillanate, hydrochloride __ 350
Polyvinylpyrrolidone _____ 10
Corn Starch _____ 40
Magnesium stearate _____ 4

The pivaloyloxymethyl ester is screened through a sieve with 1.0 mm. mesh openings. The powder is then wetted with a solution of polyvinylpyrrolidone in 150 ml. of a solvent composed of 1 part of ethanol (96%) and 19 parts of acetone. The moist mass is passed through a sieve with 1.0 mm. mesh openings and then dried at 30° C. on trays or other convenient drying equipment, f. inst. a "fluidized bed" drying cupboard.

When the solvent has evaporated, the granules are sifted through a sieve with 0.7 mm. mesh openings, and are finally mixed with the corn starch and magnesium stearate.

The granulate is compressed into tablets of 0.40 g. weight using punches and dies of 12 mm. diameter to yield 1000 tablets each contining 0.35 g. of the pivaloyloxymethyl.

EXAMPLE 2

A pharmaceutical preparation for injection

In a sterile vial is placed a single dose of 250 mg. of sterilized 6 - [(hexahydro - 1H - azepin-1-yl)-methyleneamino]-penicillanic acid. For administration by injection the compound is dissolved in 5 ml. of sterile water.

I claim:

1. A pharmaceutical composition having antibacterial activity in dosage- unit form comprising from 0.025 g. to 1 g. of, as an active ingredient, a member selected from the group consisting of 6 - [(hexahydro-1H-azepin-1-yl)-methyleneamino]-penicillanic acid, pivaloyloxymethyl 6-[(hexahydro - 1H-azepin-1-yl)-methyleneamino]-penicillanate and pharmaceutically acceptable salts thereof, together with an atoxic-pharmaceutically acceptable carrier.

2. A pharmaceutical composition as set forth in claim 1, wherein the active ingredient is 6-[(hexahydro-1H-azepin-1-yl)-methyleneamino]-penicillanic acid.

3. A pharamaceutical composition as set forth in claim 1, wherein the active ingredient is pivaloyloxymethyl 6-[(hexahydro - 1H - azepin-1-yl)-methyleneamino]penicillanate.

References Cited

UNITED STATES PATENTS 3,406,185 10/1968 Patchett et al. _____ 260—239.1
3,453,265 7/1969 Patchett et al. _____ 260—239.1

JEROME D. GOLDBERG, Primary Examiner